US 6,690,409 B1

(12) United States Patent
Takahashi

(10) Patent No.: US 6,690,409 B1
(45) Date of Patent: Feb. 10, 2004

(54) ELECTRONIC ENDOSCOPE SYSTEM

(75) Inventor: Tadashi Takahashi, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/396,374

(22) Filed: Sep. 15, 1999

(30) Foreign Application Priority Data

Sep. 16, 1998 (JP) .......................................... P10-261991

(51) Int. Cl.$^7$ ................................................ H04N 7/18
(52) U.S. Cl. ......................................................... 348/65
(58) Field of Search ................................. 345/156, 858; 348/65, 68–76; 600/101, 109, 117, 118, 168, 587; H04N 7/18

(56) References Cited

U.S. PATENT DOCUMENTS

| | | | | |
|---|---|---|---|---|
| 5,078,150 A | * | 1/1992 | Hara et al. ..................... | 348/70 |
| 5,230,623 A | * | 7/1993 | Guthrie et al. ............... | 600/587 |
| 5,327,528 A | * | 7/1994 | Hidaka et al. ............... | 345/858 |
| 5,638,819 A | * | 6/1997 | Manwaring et al. ......... | 600/117 |
| 5,825,982 A | * | 10/1998 | Wright et al. ............... | 600/118 |
| 5,871,439 A | * | 2/1999 | Takahashi et al. ............ | 348/74 |
| 5,933,135 A | * | 8/1999 | Martin ......................... | 345/156 |
| 5,990,862 A | * | 11/1999 | Lewis ........................... | 345/858 |
| 6,046,722 A | * | 4/2000 | McKiel, Jr. .................. | 345/858 |
| 6,167,296 A | * | 12/2000 | Shahidi ........................ | 600/117 |
| 6,322,497 B1 | * | 11/2001 | Takahashi ..................... | 348/65 |

* cited by examiner

Primary Examiner—Richard Lee
(74) Attorney, Agent, or Firm—Greenblum & Bernstein, P.L.C.

(57) ABSTRACT

In an electronic endoscope system, a flexible scope has a solid image sensor provided at a distal end thereof, to generate image-pixel signals. A proximal end of the scope is detachably connected to a video-signal processing unit, which produces a video signal based on the image-pixel signals. A monitor reproduces an image in accordance with the video signal. A displaying-size changer changes a size of a displaying-area of the image on a screen of the monitor to another size and vice versa. A pointer-image generator generates a pointer image on the monitor screen. A pointer-image controller controls a shifting of the pointer image on the monitor screen, and includes a pointer-image-position converter that converts a position of the pointer image on the monitor screen in accordance with the size-change of the displaying-area of the image on the monitor screen, such that two positions, indicated by the pointer image on the two-sized displaying-areas, correspond to each other.

12 Claims, 9 Drawing Sheets

ELECTRONIC ENDOSCOPE SYSTEM

BACKGROUND OF THE INVENTION

1. Field of the Invention

This invention relates to an electronic endoscope system comprising a flexible conduit or elongated scope having a solid state image sensor provided at a distal end thereof, to generate image-pixel signals; a video-signal processing unit, to which the flexible scope is detachably connected at a proximal end thereof, to produce a video signal on the basis of the image-pixel signals; and a TV monitor for reproducing an image in accordance with the video signal.

2. Description of the Related Art

In such an electronic endoscope system, a CCD (charge-coupled-device) image sensor is usually utilized as the solid state image sensor, and is associated with an objective lens system provided at the distal end of the flexible scope. Also, a flexible optical guide, formed as a bundle of optical fibers, is extended through the flexible scope, and is associated with a lighting lens system provided at the distal end of the flexible scope.

On the other hand, the video-signal processing unit includes a white-light source, such as a halogen lamp, a xenon lamp or the like. When the flexible scope is connected to the video-signal processing unit, the proximal end of the optical light guide is optically connected to the light source. Thus, an object image to be photographed is illuminated by light radiating from the distal end of the optical light guide, and is focused as an optical image on a light-receiving surface of the CCD image sensor by the objective lens system.

The focused optical image is converted into a frame of analog image-pixel signals by the CCD image sensor, and the frame of analog image-pixel signals is read from the CCD image sensor. The reading of the frame of image-pixel signals from the CCD image sensor is successively performed at a given regular time-interval, and the successively-read frames of image-pixel signals are fed to the video-signal processing unit, in which the frames of image-pixel signals are suitably processed, thereby producing a video signal including image-pixel signals and various synchronizing signals. Then, the video signal is fed from the video-signal processing unit to the monitor to reproduce the photographed object on a screen of the monitor in accordance with the video signal.

As is well known, the CCD image sensor, used in the electronic endoscope system, has a smaller size than that of a CCD image sensor used in a usual TV camera. Namely, a number of image pixels, included in one frame, obtained from the former CCD image sensor, is less than a number of image pixels, included in one frame, obtained from the latter CCD image sensor. Nevertheless, in the electronic endoscope system, the monitor having a usual standard size is used, and thus an object photographed by the CCD image sensor is only reproduced and displayed on a partial area of the screen of the monitor.

Note, in reality, although a video signal is produced and prepared with respect to an overall area of the screen of the monitor, the video signal exhibits a pedestal level over the remaining area of the screen except for the partial area on which the photographed image is only reproduced and displayed.

A size of the reproduced image is sufficient for a scope operator who observes the image at close range. However, when the reproduced image is observed at far range by some persons, for example, medical trainees, the size of the image is too small. Thus, conventionally, an electronic endoscope system has already been proposed, in which an image to be reproduced and displayed on a screen of a TV monitor can be selectively and optionally enlarged to a predetermined size.

On the other hand, in the conventional electronic endoscope system, a CRT controller is frequently incorporated in the video-signal processing unit to produce and display a pointer image on the screen of the monitor. The pointer image is superposed on an image reproduced and displayed on the screen of the monitor, and can be freely moved under control of the CRT controller. Namely, the pointer image is used to indicate a location on the reproduced and displayed image, at which, for example, a lesion occurs. Note, the CRT controller per se is well known in this field.

Conventionally, in a case where the CRT controller is utilized in the electronic endoscope system in which a size of a reproduced and displayed image is changeable on the screen of the monitor, a position of the displayed pointer image cannot be converted in accordance with the size-change of the reproduced and displayed image or displaying-area. Thus, for example, when an originally-sized image, on which a significant location is indicated by the pointer image, is enlarged to a large-sized image, it is necessary to shift and adjust the position of the pointer image on the screen of the monitor before a corresponding significant location can be indicated by the pointer image on the large-sized image. Of course, this is also true for a case where the large-sized image is returned to the originally-sized image.

SUMMARY OF THE INVENTION

Therefore, an object of the present invention is to provide an electronic endoscope system as mentioned above, in which a position of a displayed pointer image on a screen of a monitor can be automatically converted in accordance with a size-change of a reproduced and displayed image on the screen of the monitor such that two locations, indicated by the pointer image on two-sized displaying-areas, can correspond to each other.

In accordance with a first aspect of the present invention, there is provided an electronic endoscope system, which comprises: an elongated scope having a solid state image sensor, such as a CCD image sensor, provided at a distal end thereof, to generate image-pixel signals; a video-signal processing unit, to which the elongated scope is detachably connected at a proximal end thereof, to provide a video signal on the basis of the image-pixel signals; a monitor that reproduces an image in accordance with the video signal; a displaying-size changer that changes a size of a displaying-area of the reproduced image on a screen of the monitor to another size and vice versa; a pointer-image generator that generates a pointer image on the screen of the monitor; and a pointer-image controller that controls a shifting of the pointer image on the screen of the monitor. The pointer image controller includes a pointer-image-position converter that converts a position of the pointer image on the screen of the monitor in accordance with the size-change of the displaying-area of the reproduced image on the screen of the monitor, such that two positions, indicated by the pointer image on the two-sized displaying-areas, correspond to each other.

Preferably, the pointer-image-position converter comprises a two-dimensional coordinate system defined with respect to the screen of the monitor, a two-dimensional coordinate generator that generates two-dimensional coordinates representing the position of the pointer image, and a proportional position-convertor that proportionally converts a set of two-dimensional coordinates, representing a position of the pointer image on one of the two-sized displaying-areas, into another set of two-dimensional coordinates, representing a corresponding position of the pointer image on the other-sized displaying-area.

The electronic endoscope system may further comprises a shift limiter that limits a shifting of the pointer image within each of the two-sized displaying-areas. Preferably, the shift limiter comprises a boundary converter that converts a two-dimensional limit range, corresponding to one of the two-sized displaying-areas, within which the shifting of the pointer image is limited, into another two-dimensional limit range, corresponding to the other-sized displaying-areas, within which the shifting of the pointer image is limited, in accordance with the size-change of the displaying-area of the reproduced image on the screen of the monitor.

In accordance with a second aspect of the present invention, there is provided an electronic endoscope system, which comprises: an elongated scope having a solid state image sensor provided at a distal end thereof, to generate image-pixel signals; a video-signal processing unit, to which the elongated scope is detachably connected at a proximal end thereof, to produce a video signal on the basis of the image-pixel signals; a monitor that reproduces an image in accordance with the video signal; a displaying-area changer that changes a displaying-area of the reproduced image on a screen of the monitor between a first-sized displaying-area and a second-sized displaying-area; a pointer-image generator that generates a pointer image on the screen of the monitor; and a pointer-image controller that controls a shifting of the pointer image on the screen of the monitor. The pointer image controller includes a pointer-image-position converter that converts a position of the pointer image on the screen of the monitor in accordance with the displaying-area change of the reproduced image on the screen of the monitor between the first-sized displaying-area and the second-sized displaying-area, such that a position, indicated by the pointer image on the first-sized displaying-area, corresponds to a position, indicated by the pointer image on the second-sized displaying-area.

According to the second aspect of the present invention, preferably, the pointer-image-position converter comprises a two-dimensional coordinate system defined with respect to the screen of the monitor, a two-dimensional coordinate generator that generates two-dimensional coordinates representing the position of the pointer image, and a proportional position-convertor that proportionally converts a set of two-dimensional coordinates, representing a position of the pointer image on the first-sized displaying-area, into another set of two-dimensional coordinates, representing a corresponding position of the pointer image on the second-sized displaying-area.

According to the second aspect of the present invention, the electronic endoscope system may comprises a shift limiter that limits a shifting of the pointer image within each of the first-sized and second-sized displaying-areas. Preferably, the shift limiter comprises a boundary converter that converts a two-dimensional limit range, corresponding to the first-sized displaying-area, within which the shifting of the pointer image is limited, into another two-dimensional limit range, corresponding to the second-sized displaying-areas, within which the shifting of the pointer image is limited, in accordance with the displaying-area change of the reproduced image on the screen of the monitor between the first-sized displaying-area and the second-sized displaying-area.

BRIEF DESCRIPTION OF THE DRAWINGS

The object and other objects of the present invention will be better understood from the following description, with reference to the accompanying drawings in which.

DESCRIPTION OF THE PREFERRED EMBODIMENTS

Figure 1:
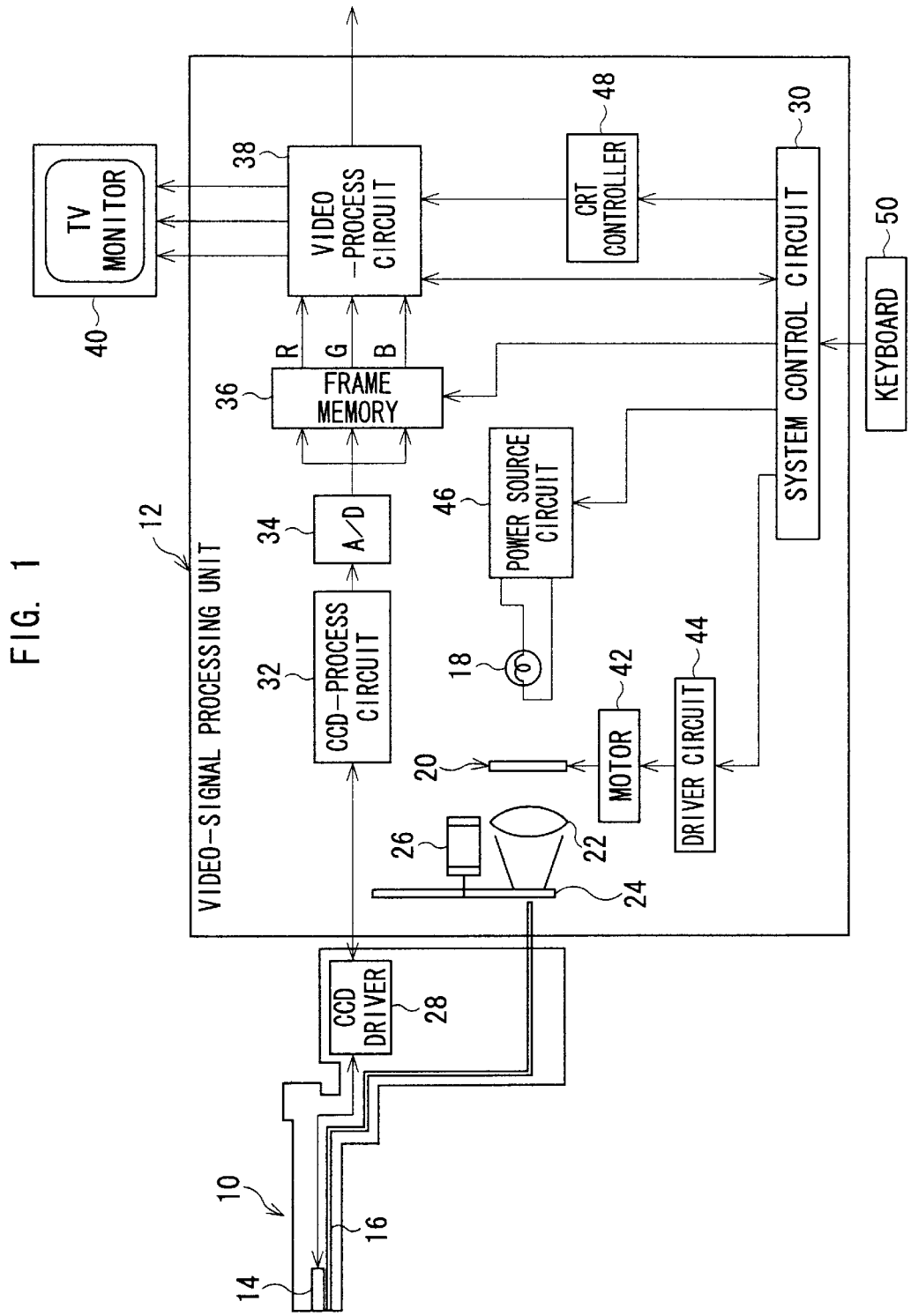
FIG. 1 is a schematic block diagram of an electronic endoscope system according to the present invention.

With reference to FIG. 1, an electronic endoscope system according to the present invention is illustrated as a block diagram. The electronic endoscope system comprises a flexible conduit or elongated scope 10, and a video-signal processing unit 12 to which the flexible elongated scope 10 is detachably connected at a proximal end thereof.

The flexible elongated scope 10 includes an objective lens system (not shown) provided at a distal end thereof, and a solid state image sensor 14, such as a CCD (charge-coupled-device) image sensor, associated therewith. An optical object to be photographed is focused, as an optical image, on a light-receiving surface of the CCD image sensor 14 by the objective lens system.

The flexible elongated scope 10 also includes an optical light guide 16 extended therethrough and formed as a bundle of optical fibers. The optical light guide 16 terminates at a light-radiating end face at the distal end of the flexible scope 10, and is associated with a lighting lens system (not shown) provided thereat. When the flexible scope 10 is connected to the video-signal processing unit 12, the proximal end of the optical light guide 16 is optically connected to a white-light source 18, such as a halogen lamp, a xenon lamp or the like, provided in the video-signal processing unit 12. The light, emitted from the white-light source or lamp 18, is directed to the proximal end of the optical light guide 16, and then radiates as an illuminating-light from the distal end of the optical light guide 16.

As shown in FIG. 1, an aperture-stop 20 and a condenser lens 22 are provided between the white-light lamp 18 and the proximal end of the optical light guide 16. The aperture-stop 20 is used to adjust an amount of the light directed from the lamp 18 to the proximal end of the optical light guide 16, i.e. an amount of the illuminating-light radiating from the distal end of the optical light guide 16. The condenser lens 22 is used to converge the light, emitted from the lamp 18, on the proximal end of the optical light guide 16.

In this embodiment, for reproduction of a photographed image as a color image, an RGB field sequential-type color imaging system is incorporated in the electronic endoscope system. Thus, a rotary RGB color filter disk 24 is interposed between the white-light lamp 18 and the proximal end of the optical light guide 16.

The rotary RGB color filter disk 24 has three sector-shaped color filters, i.e. a red filter, a green filter and a blue filter, and these color filters are circumferentially and uniformly arranged such that three centers of the color filters are spaced from each other at regular angular-intervals of 120 degrees, with a sector area between two adjacent color filters serving as a light-shielding area.

As shown in FIG. 1, the rotary RGB color filter disk 24 is rotated by a suitable electric motor 26, such as a servo-motor, a stepping motor or the like, at a given rotational frequency in accordance with a used image-reproduction method, such as the NTSC system, the PAL system or the like, whereby an optical object to be photographed is sequentially illuminated by red light, green light and blue light. Namely, a red optical image, a green optical image and a blue optical image are sequentially and cyclically focused on the light-receiving surface of the CCD image sensor 14.

Note, in the NTSC system, the rotational frequency of the color filter disk 24 is 30 Hz, and, in the PAL system, the rotational frequency of the color filter disk 24 is 25 Hz.

Each of the red, green and blue optical images is sequentially converted into a frame of monochromatic (red, green, blue) analog image-pixel signals by the CCD image sensor 14, and the monochromatic (red, green, blue) analog image-pixel signals are successively read from the CCD image sensor 14 over consecutive light-shielding time periods corresponding to the light-shielding areas between two adjacent color filters. The reading of the monochromatic (red, green, blue) analog image-pixel signals from the CCD image sensor 14 is performed in accordance with a series of clock pulses, having a given frequency, output from a CCD driver circuit 28 provided in the flexible scope 10.

As shown in FIG. 1, the video-signal processing unit 12 is provided with a system control circuit 30, which may be constituted as a microcomputer, used to control the electronic endoscope system as a whole, comprising, for example, a central processing unit (CPU), a read-only memory (ROM) for storing programs and constants, a random-access memory (RAM) for storing temporary data, and an input/output interface circuit (I/O).

The video-signal processing unit 12 is provided with a CCD-process circuit 32, which is connected to the CCD driver circuit 28 when the flexible scope 10 is connected to the video-signal processing unit 12. The monochromatic analog image-pixel signals, read from the CCD image sensor 14 by the CCD driver circuit 28, are fed to the CCD-process circuit 32, in which the monochromatic image-pixel signals are subjected to various image-processings, such as a white-balance correction processing, a gamma-correction processing, a profile-enhancing processing and so on.

The monochromatic analog image-pixel signals, suitably processed in the CCD-process circuit 32, are fed to an analog-to-digital (A/D) converter 34, and are converted by the A/D converter 34 into monochromatic digital image-pixel signals which are temporarily stored in a frame memory 36. In this frame memory 36, three frame memory sections are defined for the storage of red digital image-pixel signals, green digital image-pixel signals and blue digital image-pixel signals, respectively. In short, the monochromatic digital image-pixel signals are stored in a corresponding frame memory section defined in the frame memory 36.

Then, the respective red, green and blue digital image-pixel signals are simultaneously read from the three frame memory sections of the frame memory 36, and are output to a video-process circuit 38, as a red digital video signal R, a green digital video signal G and a blue digital video signal B, respectively. Namely, each of the red, green and blue digital video signals R, G and B is produced by suitably adding various synchronizing signals to the monochromatic (red, green, blue) digital image-pixel signals read from the frame memory 36.

In the video-process circuit 38, the red digital video signal R, the green digital video signal G and the blue digital video signal B are converted into a red analog video signal, a green analog video signal and a blue analog video signal, respectively, and each of the red, green and blue analog video signals is processed such that a high frequency noise component is eliminated therefrom. Then, the red, green and blue analog video signals are output from the video process circuit 38 to a TV monitor 40 to thereby reproduce and display the photographed color image on a screen thereof.

Also, the video-process circuit 38 includes a color encoder for producing various types of color digital video signals on the basis of the red, green and blue digital video signals, and the various types of video color digital signals are output from the video-process circuit 38 to various pieces of peripheral equipment (not shown), such as a remote monitor, a video tape recorder, a printer, an image-processing computer and so on.

As shown in FIG. 1, the aperture-stop 20 is operated by a suitable electric motor 42, such as a servo-motor, a stepping motor or the like, driven by a series of driver clock pulses output from a driver circuit 44, which is operated under control of the system control circuit 30. The operation of the aperture-stop 20 is controlled in a well-known manner such that an amount of the light passing through the aperture-stop 20, and therefore, a radiation of light from the distal end of the optical light guide 16 is regulated so that a constant luminance of a reproduced image on the monitor 40 can be maintained. Also, as shown in FIG. 1, the lamp 18 is electrically powered by a power source circuit 46, which is operated under control of the system control circuit 30, whereby the lamp 18 is lit.

Further, the video-signal processing unit 12 features a CRT controller 48 which is operated through a keyboard 50 under control of the system control circuit 30. The CRT controller 48 produces a pointer image on the screen of the monitor 40 such that the pointer image is superposed on a photographed image reproduced and displayed on the monitor screen, and controls a shifting or movement of the pointer image within a partial area of the screen of the monitor 40, on which the photographed image is reproduced and displayed.

Figure 2:
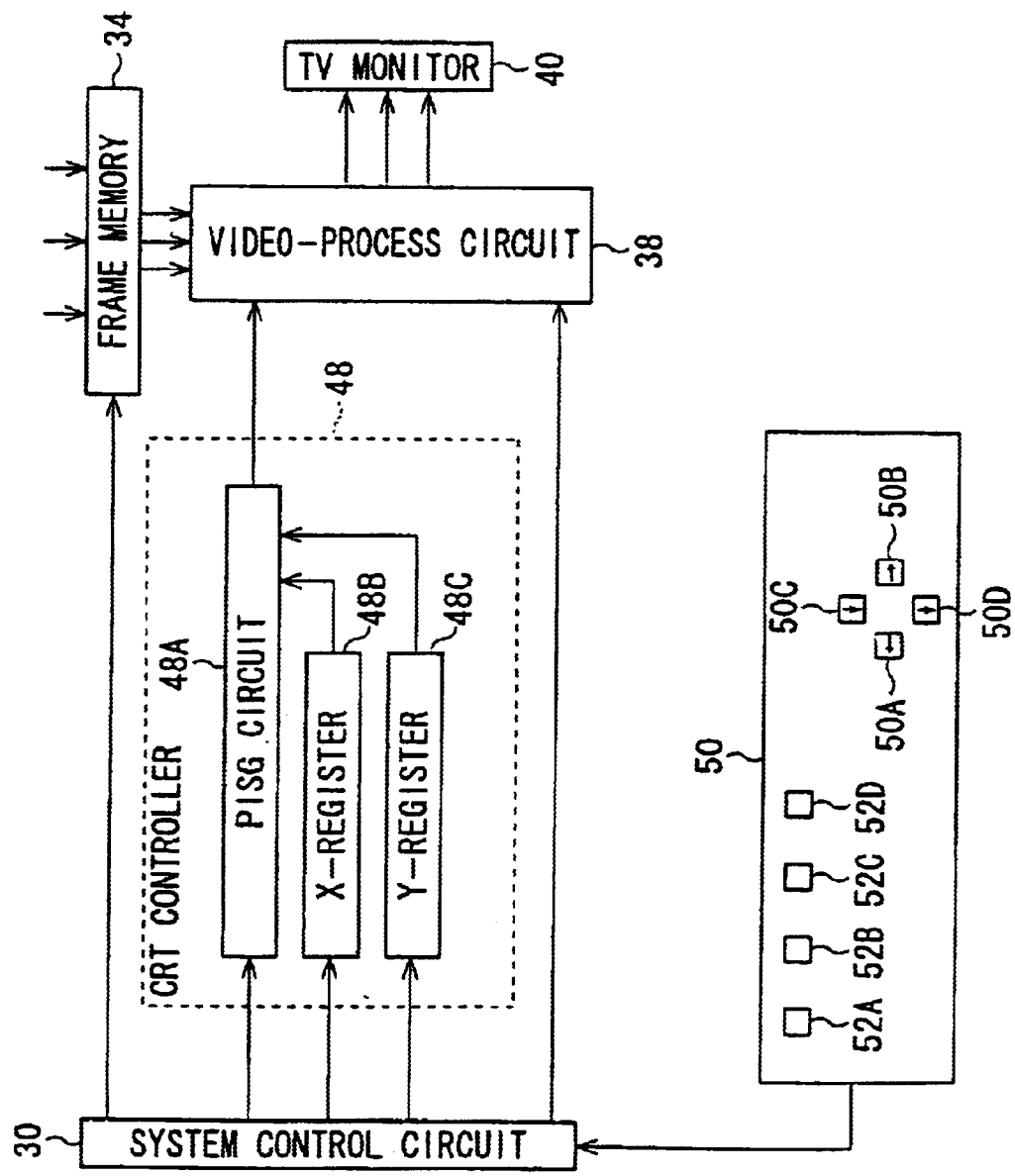
FIG. 2 is a block diagram of a CRT controller provided in the schematic block diagram of the electronic endoscope system of FIG. 1.

As shown in FIG. 2, the CRT controller 48 includes a pointer-image-signal-generating (PISG) circuit 48A which generates pointer-image signals, representing the pointer image, under control of the system control circuit 30. The pointer-image signals are output at a given timing from the PISG circuit 48A to the video-process circuit 38, in which the pointer-image signals are superposed on a video signal representing a photographed image, whereby the pointer image is displayed at a given position on the screen of the monitor 40, as shown by way of example in FIG. 3.

Figure 3:
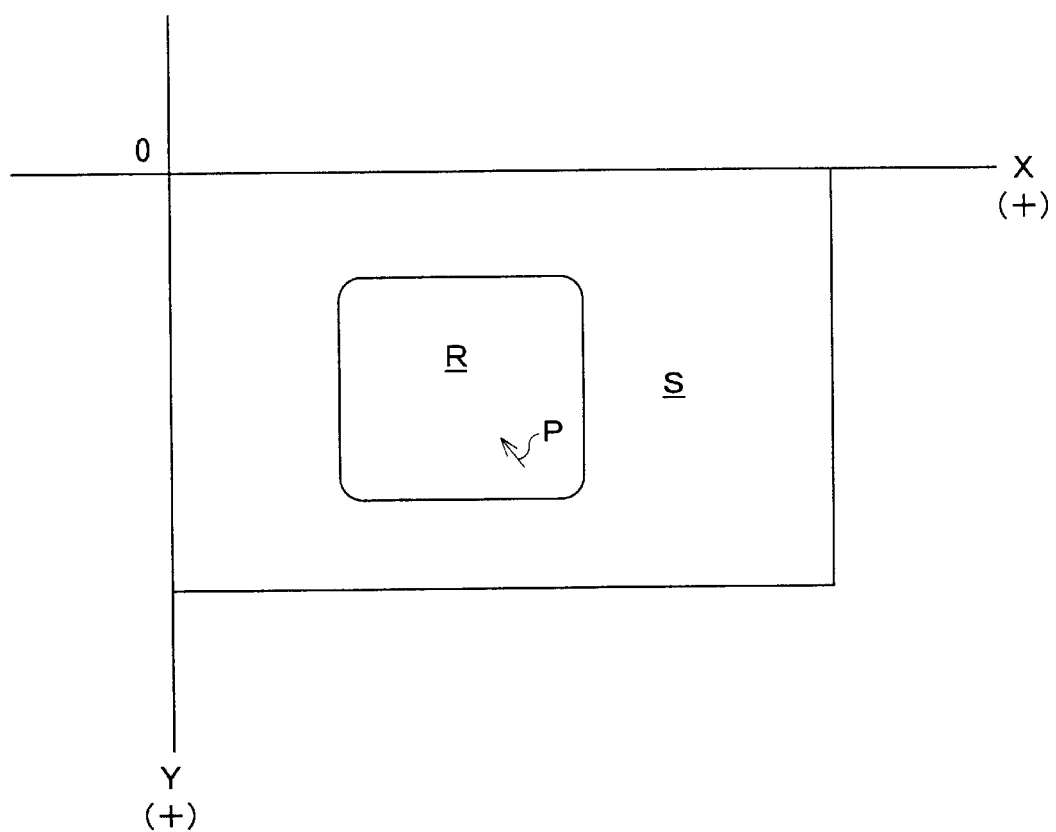
FIG. 3 is a conceptual view showing, by way of example, a screen of a TV monitor together with a pointer image, forming a part of the electronic endoscope system of FIG. 1.

Note, in FIG. 3, reference "P" indicates the pointer image; reference "S" indicates the screen of the monitor 40; and reference "R" indicates the partial area of the screen "S" of the monitor 40, on which the photographed image is reproduced and displayed. Also, note, as shown in FIG. 3, an X-Y coordinate system is defined with respect to the screen of the monitor 40, and an origin of the X-Y coordinate system is positioned at a corner of the screen of the monitor screen 40.

As shown in FIG. 2, the CRT controller 48 also features an X-coordinate register 48B and a Y-coordinate register 48C, and both the registers 48B and 48C control the timing of the output of the pointer-image signals from the PISG circuit 48A to the video-process circuit 38. Namely, the registers 48B and 48C respectively hold X-coordinate data and Y-coordinate data, and the timing of the output of the pointer-image signals from the PISG circuit 48A to the video-process circuit 38 is controlled in accordance with a combination of the X-coordinate data and the Y-coordinate data, such that the pointer image "P" is displayed at an X-Y coordinate position represented by the combination of the X-coordinate data and the Y-coordinate data. Thus, by varying one or both of the X-coordinate data and the Y-coordinate data, it is possible to shift and move the displayed pointer image "P" on the screen of the monitor 40.

The X-coordinate data and the Y-coordinate data can be changed by manipulating the keyboard 50. In particular, the change of the x-coordinate data and the Y-coordinate data can be performed by manipulating four shift keys 50A, 50B, 50C and 50D. Whenever the left-shift key 50A is depressed, the X-coordinate data is reduced by a unit of value, so that the pointer image "P" is shifted left by a unit of distance, and, whenever the right-shift key 50B is depressed, the X-coordinate data is increased by the unit of value, so that the pointer image "P" is shifted right by the unit of distance. Similarly, whenever the up-shift key 50C is depressed, the Y-coordinate data is decreased by a unit of value, so that the pointer image "P" is shifted upward, and, whenever the down-shift key 50D is depressed, the Y-coordinate data is increased by the unit of value, so that the pointer image "P" is shifted downward by the unit of distance. Note, in this embodiment, the shifting or movement of the pointer image "P" is limited within the partial area "R" of the screen "S" of the monitor 40.

Thus, when the function key 52A is depressed, three-primary color image-pixel signals included in one frame are increased by a suitable interpolation processing, executed in the video-process circuit 38, such that the partial area "R", on which a photographed image is reproduced and displayed, is expanded to a predetermined large area on the screen "S" of the monitor 40. Namely, by the depression of the function key 52A, an image to be reproduced and displayed on the screen "S" of the monitor 40 is enlarged to a large-sized image at a predetermined magnification. After the enlargement of the reproduced and displayed image to the large-sized image, when the function key 52A is again depressed, the execution of the interpolation processing in the video-process circuit 38 is stopped, whereby the large-sized image is returned to the originally-sized image. In short, in this embodiment, the function key 52A serves as the enlargement/return key for enlarging the reproduced and displayed image to the large-sized image and for returning the large-sized image to the originally-sized image.

Figure 4:
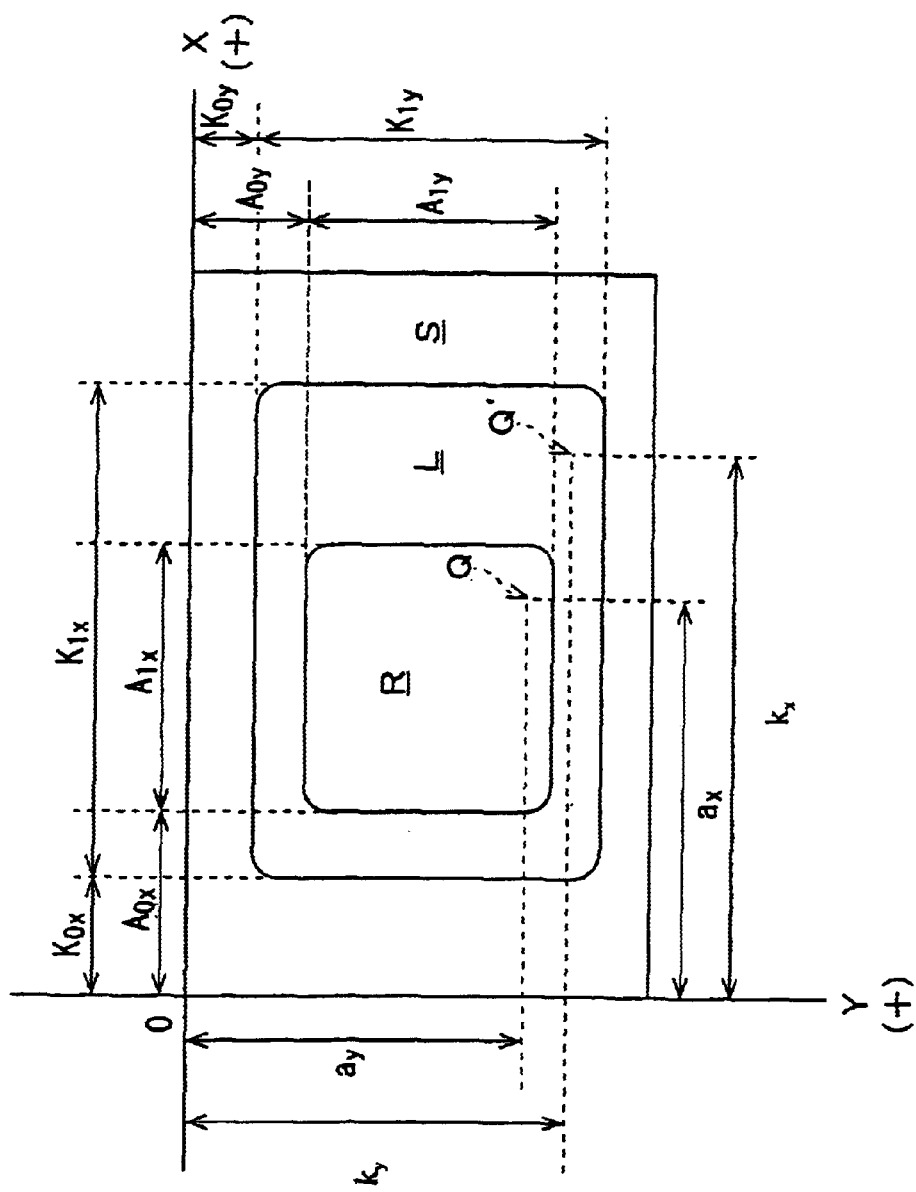
FIG. 4 is a conceptual view, similar to FIG. 3, showing simultaneously an originally-sized-image-displaying area and a large-sized-image-displaying area on the screen of the TV monitor.

With reference to FIG. 4, which is similar to FIG. 3, the expanded area on the screen "S" of the monitor 40, on which the large-sized image is reproduced and displayed, is indicated by reference "L". As is apparent from this drawing, the expanded area or large-sized-image-displaying area "L" on the screen "S" of the monitor 40 is defined by a left boundary represented by an X-coordinate $K_{0x}$, a right boundary represented by an X-coordinate $(K_{0x}+K_{1x})$, an upper boundary represented by a Y-coordinate $K_{0y}$, and a lower boundary represented by a Y-coordinate $(K_{0y}+K_{1y})$. Also, the partial area or originally-sized-image-displaying area "R" on the screen "S" of the monitor 40 is defined by a left boundary represented by an X-coordinate $A_{0x}$, a right boundary represented by an X-coordinate $(A_{0x}+A_{1x})$, an upper boundary represented by a Y-coordinate $A_{0y}$, and a lower boundary represented by a Y-coordinate $(A_{0y}+A_{1y})$.

If the X-coordinate register 48B and Y-coordinate register 48C respectively hold an X-coordinate data $a_x$ and a Y-coordinate data $a_y$, the pointer image "P" (FIG. 3) is displayed at a position represented by the X-Y coordinates $Q(a_x, a_y)$ on the originally-sized-image-displaying area "R", as shown in FIG. 4. Note, strictly speaking, the X-Y coordinates $Q(a_x, a_y)$ represent a tip of an arrow head of the pointer image "P" (FIG. 3).

Conventionally, although when the originally-sized-image-displaying area "R" is expanded to the large-sized-imaged-displaying area "L" due to the depression of the function key 52A, the pointer image "P" (FIG. 3) remains at the position represented by the X-Y coordinates $Q(a_x, a_y)$, because the coordinate data $a_x$ and $a_y$, held by the registers 48B and 48C, are not changed.

According to the present invention, as soon as the originally-sized-image-displaying area "R" is expanded to the large-sized-image-displaying area "L", the X-coordinate data $a_x$, held by the X-coordinate register 48B, is changed to a X-coordinate data $k_x$, and the Y-coordinate data $a_y$, held by the Y-coordinate register 48C, is changed to a Y-coordinate data $k_y$. Of course, the position on the originally-sized-image-displaying area "R", represented by the X-Y coordinates $Q(a_x, a_y)$, correspond to the position on the large-sized-image-displaying area "L", represented by the X-Y coordinates $Q'(k_x, k_y)$. Thus, for example, when a lesion location is indicated by the pointer image "P" on an image reproduced and displayed on the originally-sized-image-displaying area "R", and when the image concerned is enlarged by the depression of the function key 52A, an indication of a corresponding lesion location by the pointer image "P" can be ensured on an enlarged image reproduced and displayed on the large-sized-image-displaying area "L".

A conversion of the X-Y coordinates $Q(a_x, a_y)$ into the X-Y coordinates $Q'(k_x, k_y)$ is performed by the following proportional calculations:

$$k_x = K_{0x} + (K_{1x}/A_{1x})*(a_x - A_{0x}) \tag{1}$$

$$k_y = K_{0y} + (K_{1y}/A_{1y})*(a_y - A_{0y}) \tag{2}$$

Also, conversion of the X-Y coordinates $Q'(k_x, k_y)$ into the X-Y coordinates $Q(a_x, a_y)$ is performed by the following proportional calculations:

$$a_x = A_{0x} + (A_{1x}/K_{1x})*(k_x - K_{0x}) \tag{3}$$

$$a_y = A_{0y} + (A_{1y}/K_{1y})*(k_y - K_{0y}) \tag{4}$$

Herein, of course, $A_{1x}$: a horizontal width of the originally-sized-image-displaying area "R";

$A_{1y}$: a vertical height of the originally-sized-image-displaying area "R";

$A_{0x}$: a horizontal distance between the Y-axis and the left boundary of the originally-sized-image-displaying area "R";

$A_{0y}$: a vertical distance between the X-axis and the upper boundary of the originally-sized-image-displaying area $K_{1x}$: a horizontal width of the large-sized-image-displaying area "L";

$K_{1y}$: a vertical height of the large-sized-image-displaying area "L".

$K_{0x}$: a horizontal distance between the Y-axis and the left boundary of the large-sized-image-displaying area "L"; and $K_{0y}$: a vertical distance between the X-axis and the upper boundary of the large-sized-image-displaying area "L".

Figure 5:
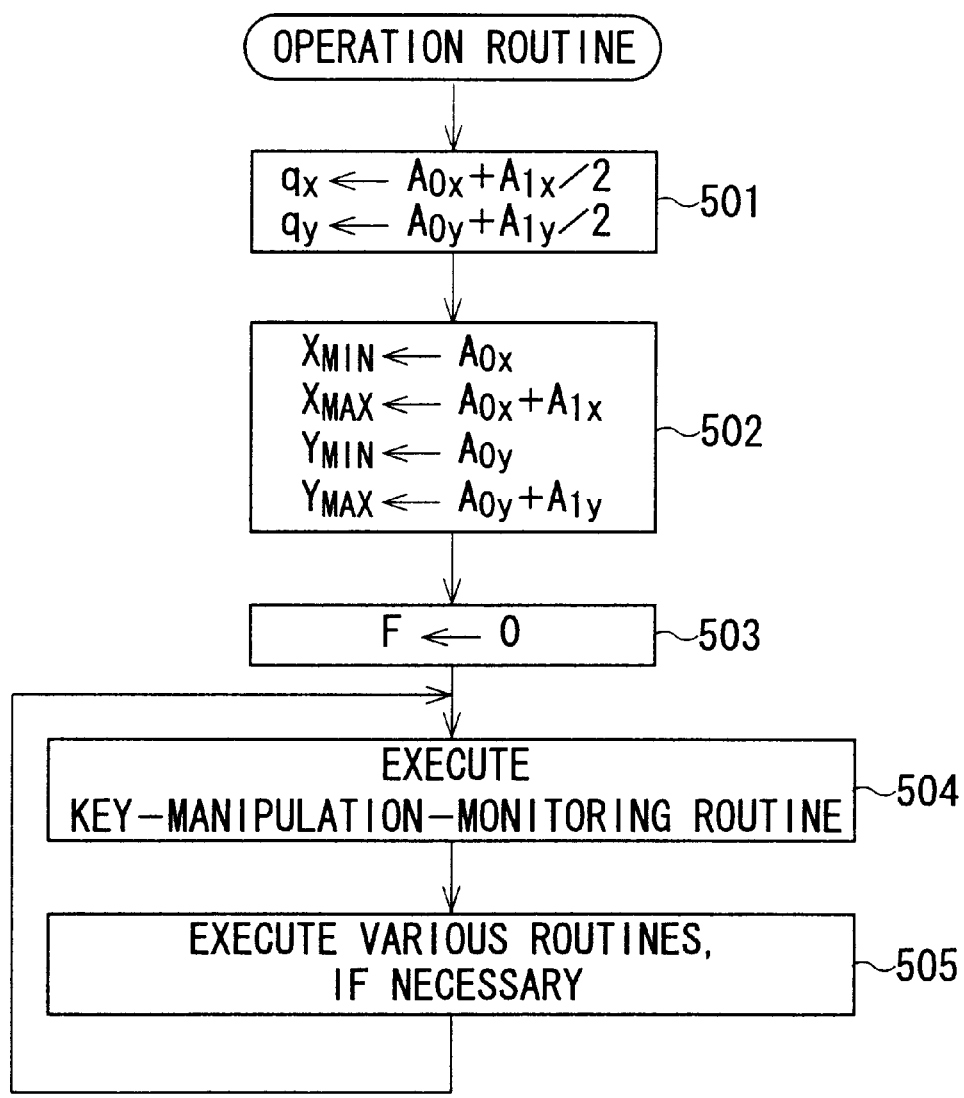
FIG. 5 is a flowchart of an operation routine executed in the electronic endoscope system of FIG. 1.

FIG. 5 shows a flowchart of an operation routine for the aforementioned electronic endoscope system, executed by the system control circuit 30, and the execution of the operation routine is started by turning ON a power ON/OFF switch (not shown) of the video-signal processing unit 12.

At step 501, the following calculations are executed:

$$q_x \leftarrow A_{0x} + A_{1x}/2$$

$$q_y \leftarrow A_{0y} + A_{1y}/2$$

Herein, $q_x$ is a variable to be written in the X-coordinate register 48B, and $q_y$ is a variable to be written in the Y-coordinate register 48C.

Namely, at step 501, X-Y coordinates of the center of the originally-sized-image-displaying area "R" are calculated, and the calculated results $q_x$ and $q_y$ are written in the registers 48B and 48C, respectively, whereby the pointer image "P" (FIG. 3) is displayed at the center of the originally-sized-image-displaying area "R". Note, at an initial stage just after the power ON/OFF switch is turned ON, the video-signal processing unit 12 is set that a photographed image is reproduced and displayed on the originally-sized-image-displaying area "R".

At step 502, the following calculations are executed:

$$X_{MIN} \leftarrow A_{0x}$$

$$X_{MAX} \leftarrow A_{0x} + A_{1x}$$

$$Y_{MIN} \leftarrow A_{0y}$$

$$Y_{MAX} \leftarrow A_{0y} + A_{1y}$$

As is apparent from FIG. 4, the calculated results $X_{MIN}$, $X_{MAX}$, $Y_{MIN}$ and $Y_{MAX}$ represent the left, right, upper and lower boundaries of the originally-sized-image-displaying area "R", respectively, and a shifting or movement of the pointer image "P" (FIG. 3) is limited within an area which is defined by the four boundaries $X_{MIN}$, $X_{MAX}$, $Y_{MIN}$ and $Y_{MAX}$ of the originally-sized-image-displaying area "R", as described hereinafter in an explanation of first, second, third and fourth pointer-shifting routines respectively shown in FIGS. 8, 9, 10 and 11.

At step 503, a flag F is initialized to be "0". The flag F indicates whether either the originally-sized-image-displaying area "R" or the large-sized-image-displaying area "L" is set on the screen "S" of the monitor 40. Namely, if F=0, it indicates that the originally-sized-image-displaying area "R" is set on the screen "S" of the monitor 40, and if F=1, it indicates that the large-sized-image-displaying area "L" is set on the screen "S" of the monitor 40. As mentioned hereinafter, when the function key or enlargement/return key 52A is initially depressed after the turning-ON of the power ON/OFF switch, the flag F is changed from "0" to "1", and, when the enlargement/return key 52A is again depressed, the flag F is returned from "1" to "0".

Figure 6:
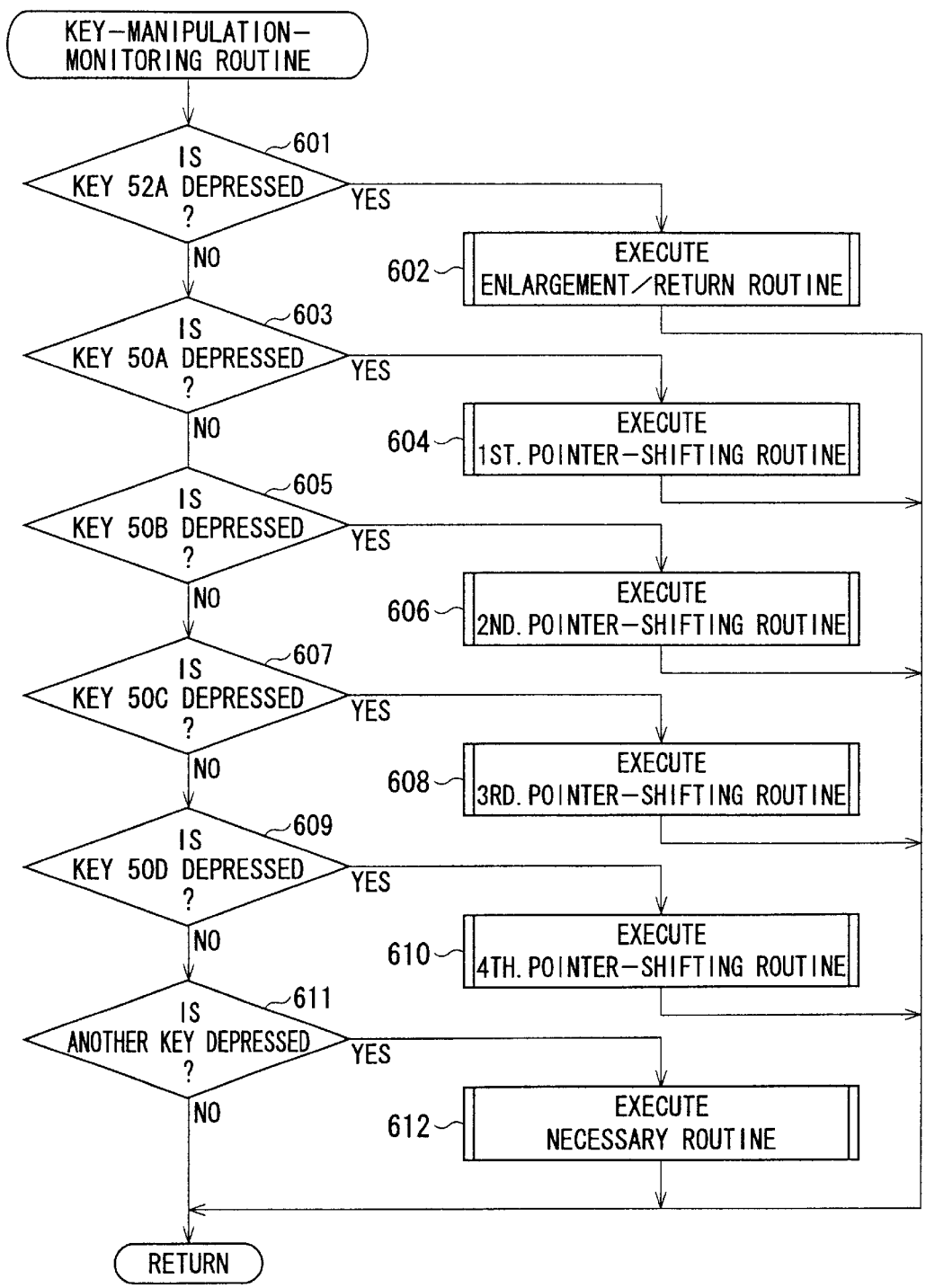
FIG. 6 is a flowchart of a key-manipulation-monitoring routine forming a part of the operation routine of FIG. 5.

At step 504, a key-manipulation-monitoring routine, as shown in FIG. 6, is executed, whereby depressions of various keys, especially the shift keys 50A, 50B, 50C and 50D and the enlargement/return key 52A, on the keyboard 50 are monitored, as stated in detail hereinafter. Then, at step 505, various routines, which are necessary for the operation of the system, are executed. For example, at step 505, a control routine for the aperture-stop 20 is executed, whereby a constant luminance of a reproduced image on the monitor 40 can be maintained.

Note, the routine comprising steps 504 and 505 is repeatedly executed at a suitable regular time-interval of, for example, 2 ms.

FIG. 6 shows a flowchart of the key-manipulation-monitoring routine executed in step 504 of FIG. 5.

Figure 7:
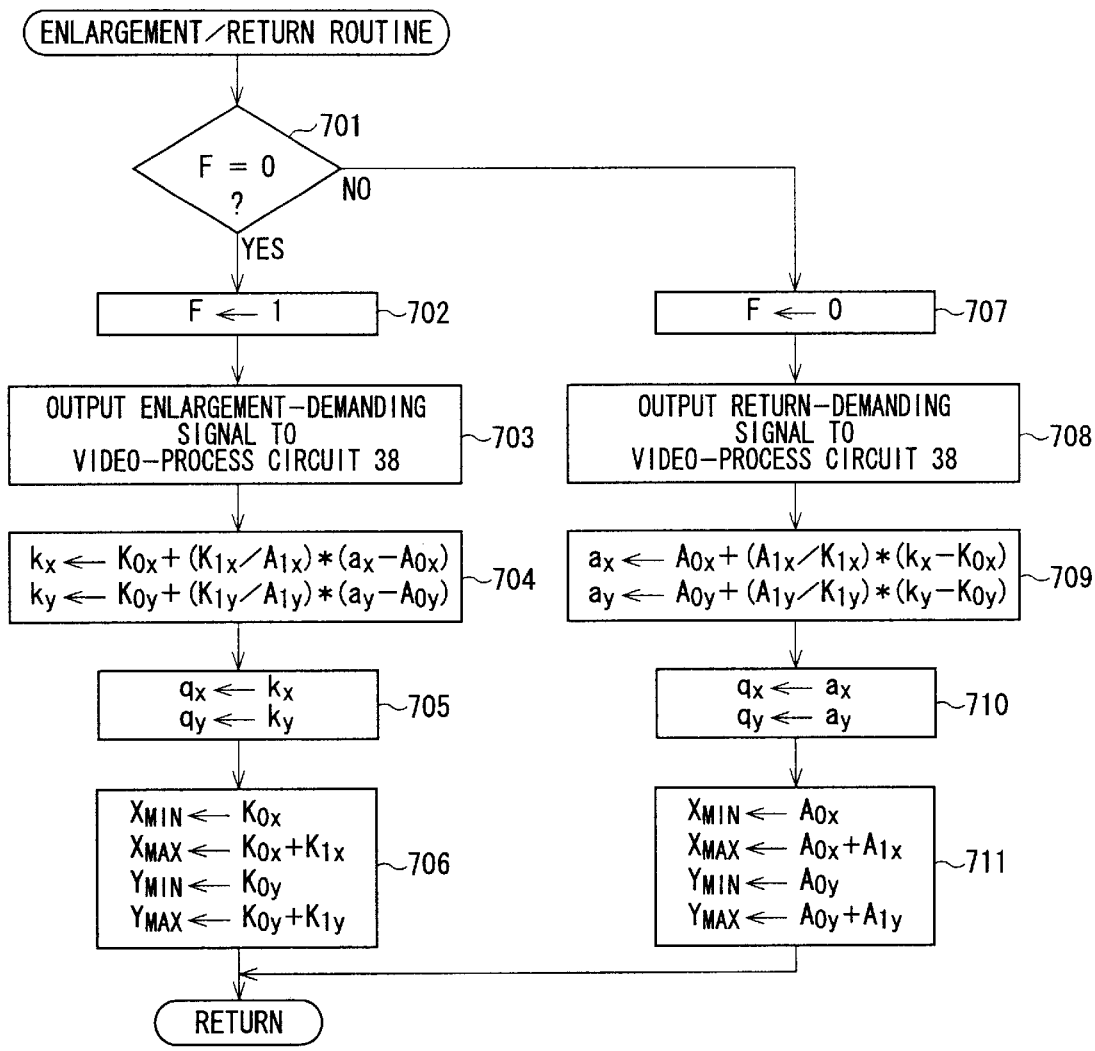
FIG. 7 is a flowchart of an enlargement/return routine forming a part of the key-manipulation-monitoring routine of the FIG. 6.

At step 601, it is determined whether the function key or enlargement/return key 52A is depressed. If the depression of the enlargement/return key 52A is confirmed, the control proceeds to step 602, in which an enlargement/return routine, as shown in FIG. 7, is executed. If the depression of the enlargement/return key 52A is not confirmed, the control proceeds from step 601 to step 603.

Figure 8:
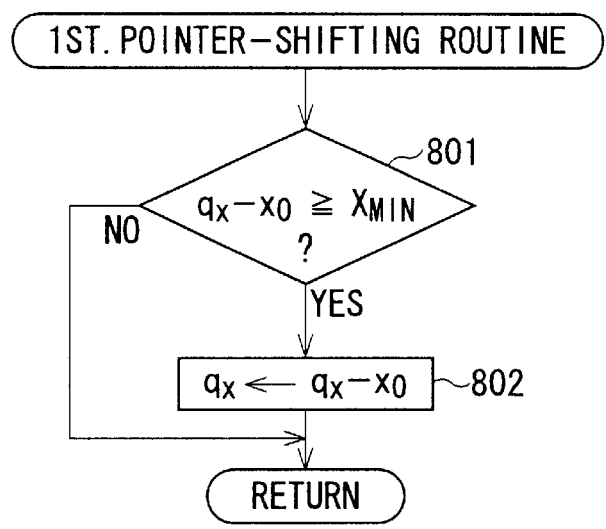
FIG. 8 is a flowchart of a first pointer-shifting routine forming a part of the key-manipulation-monitoring routine of the FIG. 6.

At step 603, it is determined whether the left-shift key 50A is depressed. If the depression of the left-shift key 50A is confirmed, the control proceeds to step 604, in which a first pointer-shifting routine, as shown in FIG. 8, is executed. If the depression of the left-shift key 50A is not confirmed, the control proceeds from step 603 to step 605.

Figure 9:
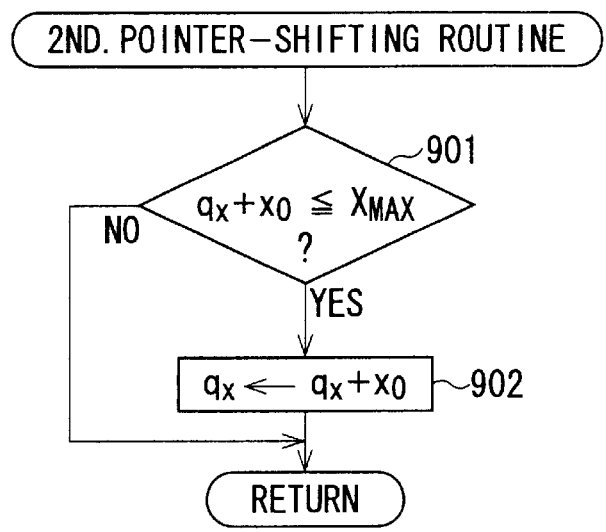
FIG. 9 is a flowchart of a second pointer-shifting routine forming a part of the key-manipulation-monitoring routine of the FIG. 6.

At step 605, it is determined whether the right-shift key 50B is depressed. If the depression of the right-shift key 50B is confirmed, the control proceeds to step 606, in which a second pointer-shifting routine, as shown in FIG. 9, is executed. If the depression of the right-shift key SOB is not confirmed, the control proceeds from step 605 to step 607.

Figure 10:
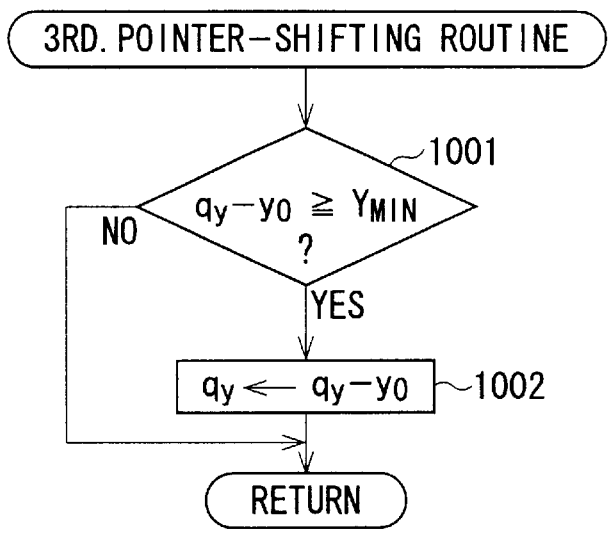
FIG. 10 is a flowchart of a third pointer-shifting routine forming a part of the key-manipulation-monitoring routine of the FIG. 6.

At step 607, it is determined whether the up-shift key 50C is depressed. If the depression of the up-shift key 50C is confirmed, the control proceeds to step 608, in which a third pointer-shifting routine, as shown in FIG. 10, is executed. If the depression of the up-shift key 50C is not confirmed, the control proceeds from step 607 to step 609.

Figure 11:
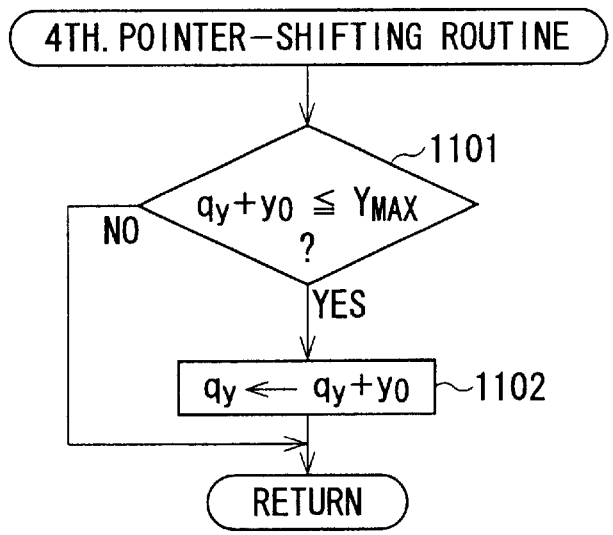
FIG. 11 is a flowchart of a fourth pointer-shifting routine forming a part of the key-manipulation-monitoring routine of the FIG. 6.

At step 609 it is determined whether the down-shift key 50D is depressed. If the depression of the down-shift key 50D is confirmed, the control proceeds to step 610, in which a fourth pointer-shifting routine, as shown in FIG. 11, is executed. If the depression of the down-shift key 50D is not confirmed, the control proceeds from step 609 to step 611.

At step 611, it is determined whether another key on the keyboard 50 is depressed. If the depression of the other key concerned is confirmed, the control proceeds to step 612, in which a necessary routine is executed. Of course, step 611 is shown as a representative step for various keys on the keyboard 50 except for the pointer shift keys 50A, 50B, 50C and 50D and the enlargement/return key 52A, which especially relate to the present invention.

In any event, the execution of the key-manipulation-monitoring routine is repeated at the regular time-interval of 2 ms, and, whenever any one of the keys on the keyboard 50 is depressed, a corresponding routine is executed.

FIG. 7 shows a flowchart of the enlargement/return routine executed at step 602 of FIG. 6.

At step 701, it is determined whether the flag F is "0" or "1". If F=0, i.e. if the originally-sized-image-displaying area "R" is set on the screen "S" of the monitor 40, the control proceeds to step 702, in which the flag F is made to be "1". The value of the flag F must be changed from "0" to "1", because the expansion of the originally-sized-image-displaying area "R" to the large-sized-image-displaying area "L" is performed by the depression of the enlargement/return key 52A whenever the originally-sized-image-displaying area "R" is set on the screen "S" of the monitor 40 (F=0).

At step 703, an enlargement-demanding signal is output from the system control circuit 30 to the video-process circuit 38. By outputting the enlargement-demanding signal, in the video-process circuit 38, a suitable interpolation processing is executed such that three-primary color image-pixel signals included in one frame are increased, whereby an originally-sized image, reproduced and displayed on the originally-sized-image-displaying area "R" of the screen "S" of the monitor 40, is enlarged to a large-sized image, resulting in the expansion of the originally-sized-image-displaying area "R" to the large-sized-image-displaying area "L".

At step 704, the following proportional calculations, which are identical to the aforementioned proportional calculations (1) and (2), are executed:

$$k_x \leftarrow K_{0x} + (K_{1x}/A_{1x})*(a_x - A_{0x})$$

$$k_y \leftarrow K_{0y} + (K_{1y}/A_{1y})*(a_y - A_{0y})$$

At step 705, the calculated results $k_x$ and $k_y$ are made to be the variables $q_x$ and $q_y$, respectively. In other words, the calculated results $k_x$ and $k_y$ and are written in the registers 48B and 48C, respectively, whereby the pointer image "P" is displayed at a position, represented by the X-Y coordinates ($k_x$, $k_y$), on the large-sized-image-displaying area "L". Namely, the pointer image "P" displayed at the position represented by the X-Y coordinates ($a_x$, $a_y$) on the originally-sized-image-displaying area "R", is shifted to the corresponding position, represented by the X-Y coordinates ($k_x$, $k_y$), on the large-sized-image-displaying area "L".

At step 706 the following calculations are executed:

$$X_{MIN} \leftarrow K_{0x}$$

$$X_{MAX} \leftarrow K_{0x} + K_{1x}$$

$$Y_{MIN} \leftarrow K_{0y}$$

$$Y_{MAX} \leftarrow K_{0y} + K_{1y}$$

As is apparent from FIG. 4, the calculated results $X_{MIN}$, $X_{MAX}$, $Y_{MIN}$ and $Y_{MAX}$ represent the left, right, upper and lower boundaries of the large-sized-image-displaying area "L", respectively, and a shifting or movement of the pointer image "P" is limited within an area which is defined by the four boundaries $X_{MIN}$, $X_{MAX}$, $Y_{MIN}$ and $Y_{MAX}$ of the large-sized-image-displaying area "L", as described hereinafter in an explanation of the first, second, third and fourth pointer-shifting routines shown in FIGS. 8, 9, 10 and 11.

At step 701, If F=1, i.e. if large-sized-image-displaying area "L" is set on the screen "S" of the monitor 40, the control proceeds from step 701 to step 707, in which the flag F is made to be "0". The value of the flag F must be changed from "1" to "0", because the return of the large-sized-image-displaying area "L" to the originally-sized-image-displaying area "R" is performed by the depression of the enlargement/return key 52A whenever the large-sized-image-displaying area "L" is set on the screen "S" of the monitor 40

At step 708, a return-demanding signal is output from the system control circuit 30 to the video-process circuit 38. By outputting the return-demanding signal, the execution of the interpolation processing is stopped in the video-process circuit 38, whereby a large-sized image, reproduced and displayed on the large-sized-image-displaying area "L" of the screen "S" of the monitor 40, is returned to an originally-sized image, resulting in the return of the large-sized-image-displaying area "L" to the originally-sized-image-displaying area "R".

At step 709, the following proportional calculations, which are identical to the aforementioned proportional calculations (3) and (4), are executed:

$$a_x = A_{0x} + (A_{1x}/K_{1x})*(k_x - K_{0x})$$

$$a_y = A_{0y} + (A_{1y}/K_{1y})*(k_y - K_{0y})$$

At step 710, the calculated results $a_x$ and a are made to be the variables $q_x$ and $q_y$, respectively. In other words, the calculated results $a_x$ and $a_y$ and are written in the registers 48B and 48C, respectively, whereby the pointer image "P" is displayed at a position, represented by the X-Y coordinates ($a_x$, $a_y$), on the originally-sized-image-displaying area "L". Namely, the pointer image "P", displayed at the position represented by the X-Y coordinates ($k_x$, $k_y$) on the large-sized-image-displaying area "L", is shifted to the corresponding position, represented by the X-Y coordinates ($a_x$, $a_y$), on the originally-sized-image-displaying area "R".

At step 711, the same calculations as in step S02 of FIG. 5 are executed as follows:

$$X_{MIN} \leftarrow A_{0x}$$

$$X_{MAX} \leftarrow A_{0x} + A_{1x}$$

$$Y_{MIN} \leftarrow A_{0y}$$

$$Y_{MAX} \leftarrow A_{0y} + A_{1y}$$

Namely, as described in the explanation of step S02 of FIG. 5, the calculated results $X_{MIN}$, $X_{MAX}$, $Y_{MIN}$ and $_{MAX}$ represent the left, right, upper and lower boundaries of the originally-sized-image-displaying area "R", respectively, and the shifting or movement of the point image "P" (FIG. 3) is limited within the area which is defined by the four boundaries $X_{MIN}$, $X_{MAX}$, $Y_{MIN}$ and $_{MAX}$ of the originally-sized-image-displaying area "R".

FIG. 8 shows a flowchart of the first pointer-shifting routine executed in step 604 of FIG. 6.

At step 801, it is determined whether a result of a calculation ($q_x - x_0$) is larger than or equal to the left boundary $X_{MIN}$. Note, $x_0$ represents a minimum unit of distance with which the pointer image "P" is shifted or moved along the X-axis by once depressing either the left-shift key 50A or the right-shift key 50B. Of course, when the originally-sized-image-displaying area "R" is set on the screen "S" of the monitor 40, $X_{MIN} = A_{0x}$, and, when the large-sized-image displaying area "L" is set on the screen "S" of the monitor 40, At step 801, if $(q_x - x_0) \geq X_{MIN}$, the control proceeds to step 802, in which the result of the calculation ($q_x - x_0$) is made to be $q_x$. Namely, the variable $q_x$, held in the X-coordinate register 48B, is replaced by the result of the calculation ($q_x - x_0$), whereby the pointer image "P" is shifted left with the minimum unit of distance $x_0$ on one of the originally-sized-image-displaying area "R" and the large-sized image displaying area "L", set on the screen "S" of the monitor 40.

At step 801, if the result of the calculation ($q_x - x_0$) is smaller than the left boundary $X_{MIN}$ ($A_{0x}$ or $K_{0x}$), the control returns to the operation routine of FIG. 5, without shifting the pointer image "P". Namely, when the pointer image "P" reaches the left boundary $X_{MIN}$, it cannot cross beyond the left boundary $X_{MIN}$ by further depressing the left-shift key 50A.

FIG. 9 shows a flowchart of the second pointer-shifting routine executed in step 606 of FIG. 6.

At step 901, it is determined whether a result of a calculation $(q_x+x_0)$ is smaller than or equal to the right boundary $X_{MAX}$. Note, as stated above, $x_0$ represents the minimum unit of distance with which the pointer image "P" is shifted or moved along the X-axis by once depressing either the left-shift key 50A or the right-shift key 50B. Of course, when the originally-sized-image-displaying area "R" is set on the screen "S" of the monitor 40, $X_{MAX}=(A_{0x}+A_{1x})$, and, when the large-sized-image displaying area "L" is set on the screen "S" of the monitor 40, $X_{MAX}=(K_{0x}+K_{1x})$.

At step 901, if $(q_x+x_0) \leq X_{MAX}$, the control proceeds to step 902, in which the result of the calculation $(q_x+x_0)$ is made to be $q_x$. Namely, the variable $q_x$, held in the X-coordinate register 48B, is replaced by the result of the calculation $(q_x+x_0)$, whereby the pointer image "P" is shifted right with the minimum unit of distance $x_0$ on one of the originally-sized-image-displaying area "R" and the large-sized-image displaying area "L", set on the screen "S" of the monitor 40.

At step 901, if the result of the calculation $(q_x+x_0)$ is larger than the right boundary $X_{MAX}$ $((A_{0x}+A_{1x})$ or $(K_{0x}+K_{1x}))$, the control returns to the operation routine of FIG. 5, without shifting the pointer image "P". Namely, when the pointer image "P" reaches the right boundary $X_{MAX}$, it cannot cross beyond the right boundary $X_{MAX}$ by further depressing the right-shift key 50B.

FIG. 10 shows a flowchart of the third pointer-shifting routine executed in step 608 of FIG. 6.

At step 1001, it is determined whether a result of a calculation $(q_y-y_0)$ is larger than or equal to the upper boundary $Y_{MIN}$. Note, $y_0$ represents a minimum unit of distance with which the pointer image "P" is shifted or moved along the Y-axis by once depressing either the up-shift key 50C or the down-shift key 50D. Of course, when the originally-sized-image-displaying area "R" is set on the screen "S" of the monitor 40, $Y_{MIN}=A_{0y}$, and, when the large-sized-image displaying area "L" is set on the screen "S" of the monitor 40, $Y_{MIN}=K_{0y}$.

At step 1001, if $(q_y-y_0) \geq Y_{MIN}$, the control proceeds to step 1002, in which the result of the calculation $(q_y-y_0)$ is made to be $q_y$. Namely, the variable $q_y$, held in the Y-coordinate register 48C, is replaced by the result of the calculation $(q_y-y_0)$, whereby the pointer image "P" is shifted upward with the minimum unit of distance $y_0$ on one of the originally-sized-image-displaying area "R" and the large-sized-image displaying area "L", set on the screen "S" of the monitor 40.

At step 1001, if the result of the calculation $(q_y-y_0)$ is smaller than the upper boundary $Y_{MIN}$ ($A_{0y}$ or $K_{0y}$), the control returns to the operation routine of FIG. 5, without shifting the pointer image "P". Namely, when the pointer image "P" reaches the upper boundary $Y_{MIN}$, it cannot cross beyond the upper boundary $Y_{MIN}$ by further depressing the up-shift key 50C.

FIG. 11 shows a flowchart of the fourth pointer-shifting routine executed in step 610 of FIG. 6.

At step 1101, it is determined whether a result of a calculation $(q_y+y_0)$ is smaller than or equal to the lower boundary $Y_{MAX}$. Note, as stated above, $y_0$ represents the minimum unit of distance with which the pointer image "P" is shifted or moved along the Y-axis by once depressing either the up-shift key 50C or the down-shift key 50D. Of course, when the originally-sized-image-displaying area "R" is set on the screen "S" of the monitor 40, $Y_{MAX}=(A_{0y}+A_{1y})$, and, when the large-sized-image displaying area "L" is set on the screen "S" of the monitor 40, $Y_{MAX}=(K_{0y}+K_{1y})$.

At step 1101, if $(q_y+y_0) \leq Y_{MAX}$, the control proceeds to step 1102, in which the result of the calculation $(q_y+y_0)$ is made to be $q_y$. Namely, the variable $q_y$, held in the Y-coordinate register 48C, is replaced by the result of the calculation $(q_y+y_0)$, whereby the pointer image "P" is shifted downward with the minimum unit of distance $y_0$ on one of the originally-sized-image-displaying area "R" and the large-sized-image displaying area "L", set on the screen "S" of the monitor 40.

At step 1101, if the result of the calculation $(q_y+y_0)$ is larger than the right boundary $Y_{MAX}$ $((A_{0y}+A_{1y})$ or $(K_{0y}+K_{1y}))$, the control returns to the operation routine of FIG. 5, without shifting the pointer image "U". Namely, when the pointer image "P" reaches the right boundary $Y_{MAX}$, it cannot cross beyond the lower boundary $Y_{MAX}$ by further depressing the right-shift key 50D.

Finally, it will be understood by those skilled in the art that the foregoing description is of preferred embodiments of the system, and that various changes and modifications may be made to the present invention without departing from the spirit and scope thereof.

The present disclosure relates to subject matters contained in Japanese Patent Application No. 10-261991 (filed on Sep. 16, 1998) which is expressly incorporated herein, by reference, in its entirety.

What is claimed is:

1. An electronic endoscope system, comprising:
   an elongated scope having a solid state image sensor provided at a distal end thereof, to generate image-pixel signals;
   a video-signal processing unit, to which said elongated scope is detachably connected at a proximal end thereof, to produce a video signal on the basis of the image-pixel signals;
   a monitor that reproduces an image in accordance with the video signal;
   a displaying-size changer that changes a size of a displaying-area of the reproduced image on a screen of said monitor to another size;
   a pointer-image generator that generates a pointer image on the screen of said monitor; and
   a pointer-image controller that controls a shifting of said pointer image on the screen of said monitor,
   wherein said pointer image controller includes a pointer-image-position converter that converts a position of said pointer image on the screen of said monitor in accordance with the size change of the displaying-area of the reproduced image on the screen of said monitor, such that two positions, indicated by said pointer image on two-sized display-areas, correspond to each other.

2. An electronic endoscope system as set forth in claim 1, further comprising a shift limiter that limits a shifting of said pointer image within each of the two-sized display-areas.

3. An electronic endoscope system as set forth in claim 2, wherein said shift limiter comprises a boundary converter that converts a two-dimensional limit range, corresponding to one of the two-sized display-areas, within which the shifting of said pointer image is limited, into another two-dimensional limit range, corresponding to another-sized display-area, within which the shifting of said pointer image is limited, in accordance with the size change of the displaying-area of the reproduced image on the screen of said monitor.

4. An electronic endoscope system as set forth in claim 1, wherein said pointer-image-position converter comprises:
- a two-dimensional coordinate system defined with respect to the screen of said monitor;
- a two-dimensional coordinate generator that generates two-dimensional coordinates representing the position of said pointer image; and
- a proportional position-converter that proportionally converts a set of two-dimensional coordinates, representing a position of said pointer image on one of the two-sized display-areas, into another set of two-dimensional coordinates, representing a corresponding position of said pointer image on another-sized display-area.

5. An electronic endoscope system as set forth in claim 4, further comprising a shift limiter that limits a shifting of said pointer image within each of the two-sized display-areas.

6. An electronic endoscope system as set forth in claim 5, wherein said shift limiter comprises a boundary converter that converts a two-dimensional limit range, corresponding to one of the two-sized display-areas, within which the shifting of said pointer image is limited, into another two-dimensional limit range, corresponding to another-sized display-area, within which the shifting of said pointer image is limited, in accordance with the size-change of the displaying-area of the reproduced image on the screen of said monitor.

7. An electronic endoscope system, comprising:
- an elongated scope having a solid state image sensor provided at a distal end thereof, to generate image-pixel signals;
- a video-signal processing unit, to which said elongated scope is detachably connected at a proximal end thereof, to produce a video signal on the basis of the image-pixel signals;
- a monitor that reproduces an image in accordance with the video signal;
- a displaying-size changer that changes a displaying-area of the reproduced image on a screen of said monitor between a first-sized displaying-area and a second-sized displaying-area;
- a pointer-image generator that generates a pointer image on the screen of said monitor; and
- a pointer-image controller that controls a shifting of said pointer image on the screen of said monitor,
- wherein said pointer image controller includes a pointer-image-position converter that converts a position of said pointer image on the screen of said monitor in accordance with the displaying-area change of the reproduced image on the screen of said monitor between said first-sized displaying-area and said second-sized displaying-area, such that a position, indicated by said pointer image on said first-sized displaying-area, corresponds to a position, indicated by said pointer image on said second-sized displaying area.

8. An electronic endoscope system as set forth in claim 7, further comprising a shift limiter that limits a shifting of said pointer image within each of said first-sized and second-sized displaying-areas.

9. An electronic endoscope system as set forth in claim 8, wherein said shift limiter comprises a boundary converter that converts a two-dimensional limit range, corresponding to said first-sized display area, within which the shifting of said pointer image is limited, into another two-dimensional limit range, corresponding to said second-sized displaying-area, within which the shifting of said pointer image is limited, and in accordance with the displaying-area change of the reproduced image on the screen of said monitor between said first-sized displaying-area and said second-sized displaying-area.

10. An electronic endoscope system as set forth in claim 7, wherein said pointer-image-position converter comprises:
- a two-dimensional coordinate system defined with respect to the screen of said monitor;
- a two-dimensional coordinate generator that generates two-dimensional coordinates representing the position of said pointer image; and
- a proportional position-convertor that proportionally converts a set of two-dimensional coordinates, representing a position of said pointer image on said first-sized displaying-area, into another set of two-dimensional coordinates, representing a corresponding position of said pointer image on said second-sized displaying-area.

11. An electronic endoscope system as set forth in claim 10, further comprising a shift limiter that limits a shifting of said pointer image within each of said first-sized and second-sized displaying-areas.

12. An electronic endoscope system as set forth in claim 11, wherein said shift limiter comprises a boundary converter that converts a two-dimensional limit range, corresponding to said first-sized displaying-area, within which the shifting of said pointer image is limited, into another two-dimensional limit range, corresponding to said second-sized displaying-areas, within which the shifting of said pointer image is limited, in accordance with the displaying-area change of the reproduced image on the screen of said monitor between said first-sized displaying-area and said second-sized displaying-area.

\* \* \* \* \*